Dec. 4, 1934.   T. W. ROWLAND   1,983,004
PRIZE TICKET FOR ANIMAL RACING
Filed March 22, 1934
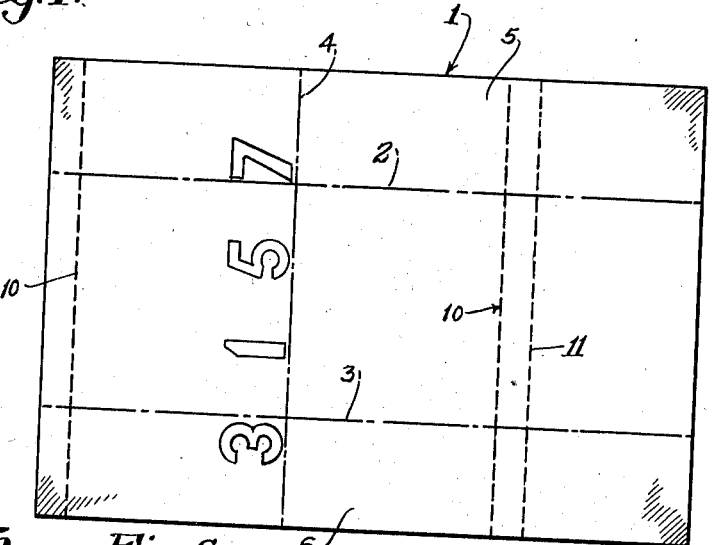
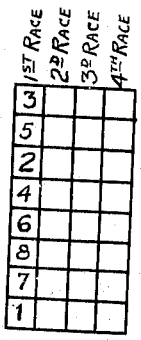
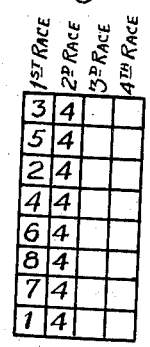
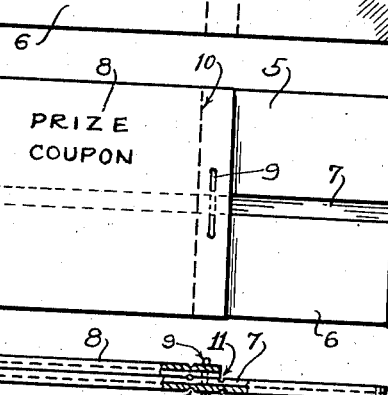
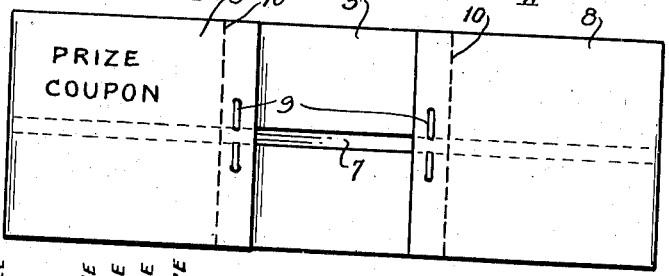
Inventor
*T. W. ROWLAND*
By *Mason Fenwick & Lawrence*
Attorneys Patented Dec. 4, 1934

1,983,004

UNITED STATES PATENT OFFICE 1,983,004

PRIZE TICKET FOR ANIMAL RACING

Thad W. Rowland, St. Petersburg, Fla.

Application March 22, 1934, Serial No. 716,890

5 Claims. (Cl. 283—6)

This invention relates to competitive animal racing and proposes means for awarding prizes through the medium of tickets or coupons each bearing a number comprising a plurality of integers arranged in certain ordination corresponding to the order of running a plurality of races or of a number of selected races of a plurality run, and the numerical values of the integers corresponding to numbers borne by or otherwise representing the winning animals in the several or selected races.

One of the objects of the invention is the provision of a ticket or coupon bearing a number as above described as a unitary adjunct to an admission ticket designed to be separated therefrom at the gate, it being contemplated that the coupon shall be torn off and handed to the purchaser of the ticket while the admission portion shall be dropped into a box provided for that purpose.

Another object of the invention is the provision of a unitary admission ticket and coupon comprising an admission portion and a coupon bearing a permutation which permutation is concealed by the folding of the coupon and the stapling of the same between two transverse lines of different degrees of weakness so that regardless of how carelessly the coupon with the concealed permutation may be detached from the admission portion, the severance will always take place on that side of the staple or other securing means which leaves the sealed condition of the coupon intact.

A further object of the invention is the provision of a unitary admission and prize coupon ticket in which the folded coupon portions bearing the concealed permutations are duplicated on each end of the admission portion one being designed to be separated from the admission portion and handed to the purchaser of the ticket while the other may be torn off from the admission portion and placed in a receptacle in reserve for verification in the event that a dispute should arise as to whether the prize winning permutations had been sold or were in circulation.

Other objects of the invention will appear as the following description of a preferred and practical embodiment thereof proceeds.

In the drawing which accompanies and forms a part of the following specification and throughout the several figures of which the same characters of reference have been designated to denote identical parts:

Figure 1 is a representation of the unfolded blank of the unitary admission ticket and coupon;

Figure 2 is a view of the blank folded;

Figure 3 is a view showing a ticket embodying two coupons;

Figure 4 is a side elevation of the ticket shown in Figure 2;

Figure 5 is a diagram illustrating a hypothetical standing of the animals at the end of the first race;

Figure 6 is a similar view showing the first two significant figures in the eligible permutations at the end of the second race;

Figure 7 is a similar view showing the three significant figures of the permutations eligible at the end of the third race; and Figure 8 is a similar view showing the prize winning permutations for all of eight prizes.

Referring now in detail to the several figures and first adverting to that form of the invention shown in Figs. 1, 2 and 4, the numeral 1 represents a blank sheet of paper having longitudinal lines of fold 2 and 3 and a transverse line of fold 4. The blank is designed to be folded upon itself along the longitudinal lines 2 and 3 and said lines are so disposed that when the side portions 5 and 6 are folded, a slight space 7 will remain between the adjacent edges of said folded portions. After the side portions have been folded in the manner indicated, the end portion 8 is folded upon itself along the line 4 and fastened down preferably by a staple 9 or by any other suitable means, said staple preferably passing through all superposed thicknesses of material.

It will be observed from the blank that a permutation which in the present instance consists of a number of four figures is printed or otherwise inscribed upon the blank adjacent the transverse line of fold 4 and in a position to be concealed when the blank is folded in the manner above set forth. Figure 2 shows that on each side of the staple 9 are lines 10 and 11 weakened by perforations or in any other suitable manner. The line 11 is formed adjacent the edge of the end portion 8, where there are only two thicknesses of material. The break at the line 10 on the other hand will be through four thicknesses of material. It follows therefore that the ticket will be more readily severable at the line 11 than at the line 10.

In consequence of this differential degree of weakness, the coupon will be invariably torn off from the admission ticket along the line 11 so that the coupon when handed to the patron will always remain sealed by the staple 9. After the patron has received his coupon at any convenient time he tears the coupon along the line 10 thus gaining access to the inside thereof and disclosing the permutation. It is obvious that until the coupon has been severed from the admission ticket and has gotten into the hands of the patron, the permutation is concealed and its disclosure to any one else is impossible.

The space 7 between the side folds 5 and 6 affords a convenient guide, leading the thumb of the ticket collector down to a point adjacent the line 11 and assisting in the clean and uniform severance of the coupon from the admission portion of the ticket.

Figure 3 shows a form of the invention in which both ends of the blank are folded up to form two coupons 12 and 13, one at each end of the admission portion 14 and each having the feature of the staple fastenings 9 flanked by the lines of weakness 10 and 11.

In this form of the invention one sealed coupon is detached and handed to the patron while the other is detached from the admission ticket and put into a special receptacle. In ninety-nine times out of a hundred, this second coupon will not be useful, but occasionally there arises a question as to the honesty of the awards, it being sometimes claimed that the winning permutation has not been sold or is not out among the patrons of the race. An examination of the duplicate coupons in this special receptacle will settle this controversy.

The application of the present invention to animal racing is exemplified by four races in each of which eight animals participate. The animals in each race are numbered from one to eight. There are thus 4096 permutations possible. One of these permutations appears on each ticket. There will thus be 4096 tickets. Of course, it will seldom happen that exactly that number of tickets will be sold and in the event that a fewer number are distributed some readjustment must be made in determining the awards of the prizes. This does not particularly concern the present invention which for the purpose of explaining the inventive principle assumes that the entire number of 4096 tickets will be in the hands of the patrons.

Supposing the first race is won by animal No. 3, the second race by animal No. 4, the third race by animal No. 7, and the fourth face by animal No. 3, it is obvious that the ticket with the permutation 3473 wins the first prize.

A diagram in Figure 5 shows by way of example a standing of the eight animals at the end of the first race. At the end of the first race while all permutations beginning with 3, 512 in number, are eligible for the first prize, it is obvious that all other permutations in the hands of the patrons are at that time eligible for one of the other prizes.

The permutations eligible for the second race are determined by the animal which wins the second race. This is clearly shown in Figure 6 in which it is assumed that animal No. 4 wins the second race. At this point, there are now 64 permutations eligible for first prize and 64 are eligible for each of the other prizes making a total of eligible tickets at the end of the second race of 512.

Referring to Figure 7, it is assumed that the third race was won by animal No. 7. The figure 7 therefore is the third significant integer limiting the number of eligible permutations. There are now eight permutations eligible for first prize and eight eligible for each of the other prizes making a total after the third race of 64 eligible tickets.

Figure 8 assumes that the fourth race was won by animal No. 3, which is the final figure, completing the eight permutations eligible for the eight prizes.

In the known method of determining the eligible permutations by the standing of the animals in the last race instead of in the first, the first three integers in each permutation corresponding to the winning animal in each of the first three races, there are after the first race only 512 permutations eligible for a prize while 3584 are not eligible; while at the end of the second race there are only 64 permutations eligible for a prize and at the end of the third race there are only eight permutations eligible. It is obvious that by the improved method of determining the awards, the interest throughout the entire series of races will be much enhanced due to the larger proportion of eligible prize winning permutations, and the fact that the prize winning permutations are not determined until all races have been run.

While I have in the above description disclosed what I believe to be a practical and preferred embodiment of the invention, and of the method of determining the awards of the first and subordinate prizes, it is to be understood that the details of procedure as described are merely exemplary and not to be construed as limiting the scope of the invention for the novel ticket with the concealed permutation is a broad application and can be employed wherever it is advantageous to deal with a concealed number.

It is obvious that neither the coupon nor the method of determining the awards need be limited to racing in which actual animals compete, but that the physical paraphernalia, and the method of determining the prize winning permutations may be equally well applied to games in which the competing entities are inanimate units.

What I claim is:

1. Ticket comprising a paper blank having one end folded over an adjacent portion of the blank, and leaving an exposed portion, the folded portion being designed to conceal beneath the fold a number representing a chance and a prize, means adjacent the end of said folded portion securing it to the underlying portion, and lines of severability on each side of said securing means, of differential values of weakness, that adjacent the exposed portion being the weaker whereby upon severing the folded portion from the exposed portion, the breach will invariably occur between the exposed and folded portions, leaving the latter intact, but subsequently openable along the line of less weakness.

2. Ticket comprising a paper blank having lateral portions folded together from both sides and having one end folded over an adjacent portion of the blank and leaving a portion on which the lateral folds are exposed, the folded portion being designed to conceal beneath the lateral folded portions and the end fold, a number representing a chance and a prize, means adjacent the end of said folded portion securing it to the underlying portion, and lines of severability on each side of said securing means of differential values of weakness, that adjacent the exposed portion being the weaker, whereby upon severing the folded from the exposed portion, the breach will invariably occur between the exposed and folded portions, leaving the latter intact, but subsequently openable along the line of less weakness.

3. Ticket as claimed in claim 2, the lateral folded portions being spaced adjacent the middle of the ticket forming on the exposed portion a guide groove leading the thumb to the line of greater weakness, facilitating the severing of the secured and exposed portions of the ticket.

4. Ticket comprising a paper blank having lateral portions folded together from both sides and having one end folded over an adjacent portion of the blank and leaving a portion on which the lateral folds are exposed, the folded portion being designed to conceal beneath the lateral folded portions and the end fold, a number representing a chance and a prize, means adjacent the end of said folded portion securing it to the underlying portion, said folded portion being of a greater plurality of thicknesses than said exposed portion, and lines of severability on each side of said securing means, one line being off the end edge of the folded portion where the ticket is weaker than along the other line, by virtue of there being fewer thicknesses of material, whereby upon severing the folded from the exposed portion, the breach will invariably occur between the exposed and folded portions, leaving the latter intact but subsequently openable along the line of less weakness.

5. Ticket as claimed in claim 2, the folded portion together with the securing means and lines of differential weakness and the concealed number being duplicated at each end of the exposed, and in this case, the intermediate portion.

THAD W. ROWLAND.